KUNIHIKO ITO AND
YUKIYA FUJIMOTO
INVENTORS 3,563,720
APPARATUS FOR MANUFACTURING A FLOAT
   GLASS RIBBON OF LESS THAN EQUILIBRIUM
   THICKNESS
Kunihiko Ito and Yukiya Fujimoto, Maizuru-shi, Japan,
   assignors to Nippon Sheet Glass Co., Ltd.
   Filed Jan. 3, 1968, Ser. No. 695,399
Claims priority, application Japan, Jan. 10, 1967,
   42/2,060
   Int. Cl. C03b 18/00
U.S. Cl. 65—182                                   2 Claims

ABSTRACT OF THE DISCLOSURE

Apparatus for manufacturing glass ribbon on a molten metal bath, wherein the glass ribbon is pressed down at the both side edge portions where the ribbon tends to be reduced in its width while being pulled longitudinally with a surface of an elongated member made of a refractory material not wettable with the glass, said surface having grooves substantially extending in a direction of the glass advancement, whereby the upper surface of the pressed edge portions of the ribbon is deformed along the grooves on the surface of said refractory material and the decrease in width of the glass ribbon is controlled. The refractory material may be made gas permeably porous so that a pressurized gas may be blown through the surface to reduce the sticking tendency of the molten glass.

---

This invention relates to a process and an apparatus for manufacturing a glass ribbon continuously by using a bath of a molten material having a specific gravity greater than that of glass.

Glass flowing onto a bath of a molten material having a greater specific gravity than the glass is expanded freely while advancing, and forms a glass layer having a certain thickness determined mainly by an interfacial tension between the glass and the molten material. A generally practised procedure to manufacture a glass ribbon having a thickness smaller than the above-mentioned thickness is to give a glass a longitudinal pulling force to accelerate it, and thereby to reduce the thickness of the glass by a predetermined amount. As, however, the width of the glass ribbon is reduced incidentally with the decrease of thickness, it is impossible to manufacture a glass ribbon of large width. Moreover, because an exposed area of the surface of a molten bath gets larger, a vigorous convection of the molten bath occurs and the glass ribbon is prone to move in zigzag fashion.

This invention has for its object the elimination of these defects and the manufacture of a glass ribbon having a small thickness and a large width. It provides a process for the continuous manufacture of a flat glass which comprises delivering molten glass onto a bath of a molten material having a specific gravity greater than that of the molten glass to form a glass ribbon and advancing and gradually cooling the glass ribbon over the bath, during which the glass ribbon, still in a plasticized state, is accelerated by subjecting it to a pulling force in a direction of its advancement, thereby reducing the thickness of the glass ribbon, characterized in that both edge portions of the glass ribbon which tends to be reduced in width while being accelerated are pressed down with the surface of an elongated member made of a refractory material which will not be wetted by the glass and has groove-like concavities and convexities substantially extending in a direction roughly the same as the advancing direction of the glass ribbon, whereby the upper surface of the pressed edge portions of the glass ribbon are deformed along the groove-like concavities and convexities on the surface of the said refractory material. In a preferred embodiment of the invention, both side edge portions of a glass ribbon which tends to be reduced in width while being accelerated are pressed down by the surface of a gas-permeably porous refractory material which will not be wetted by glass and has groove-like concavities and convexities substantially extending in a direction roughly parallel with the advancing direction of the glass, while a pressurized gas is blown against the glass from the surface of the porous refractory material. By so doing, the upper surface of the both side edge portions of the glass ribbon are deformed along the groove-like concavities and convexities of the refractory material.

This invention also provides an apparatus for use in the continuous manufacture of flat glass which comprises a tank containing a bath of a molten-material having a specific gravity greater than that of molten glass for receiving the molten glass continuously to produce a continuous ribbon of glass and means for advancing the glass ribbon on the bath, and subjecting the glass ribbon to a pulling force in its advancing direction to accelerate the portion of the glass ribbon still in a plasticized state whereby the thickness of the glass ribbon is reduced, characterized in that control means for controlling the decrease in width of the glass ribbon which tends to be reduced in width while being accelerated are provided on both sides of the glass ribbon, each of said means comprising the surface of a refractory material, which will not be wetted by the glass and has groove-like concavities and convexities substantially extending in a direction roughly the same as the advancing direction of the glass ribbon, for pressing down both edge portions of the glass ribbon; a cooling box secured to the said surface and adapted to cool the said surface; and a pulrality of pipes for supporting the said cooling box and the surface of the refractory material and circulating a cooling fluid into the said cooling box. In a preferred apparatus, the surface portion of the control means for pressing down the side edges of the glass ribbon is made of a gas-permeably refractory material having therein a cavity extending in its longitudinal direction (roughly in the advancing direction of the glass), and there is provided at least one conduit communicating with the said cavity for introducing a pressurized gas into the cavity so as to cause the gas to be blown out through the said porous surface against the glass. It is advantageous that the conduit for the gas is disposed in one of the pipes for circulating a cooling fluid to a cooling chamber.

As the above-mentioned refractory material, graphite or boron nitride is suitable. Preferable gas-permeably porous refractory materials are graphite and high alumina refractory materials having a porosity of about 15–30%.

When both edge portions of a glass ribbon, which tends to be reduced in width while being accelerated over a bath of a molten material having a specific gravity greater than that of the glass, pass under the control means, the upper surfaces of the edge portion of the glass ribbon are deformed along the groove-like concavities and convexities on the bottom of the control means. The edge portions of the glass ribbon try to move inwardly in a lateral direction, but fail because the convexities and concavities on the upper surface of the edge portions of the glass ribbon are fitted into the concavities and convexities on the bottom of the control means. The edge portions of the glass ribbon advances along the groove-like concavities and convexities of the control means provided so as to be directed towards the advancing direction of the glass ribbon or to be splayed outwardly of the glass ribbon. The width of the glass ribbon is therefore maintained constant or is gradually broadened, whereby the thickness of the glass ribbon is reduced. Because at least the portion of the control means which faces the glass is made of a refractory material not wettable with the glass, the sticking of the control means to the glass ribbon is difficult to occur and the edge portions of the glass advance without obstruction. In the preferred embodiment of the invention, at least the portion of the control means which faces the glass is made of a porous refractory material, and a pressurized gas is blown into its interior and blown out from the surface. Hence, a slight gap comes into existence between the control means and the glass, and even when the glass is maintained at whatever high temperatures, the sticking of the glass to the control means is completely prevented. Accordingly, the edge portions of the glass ribbon advance without any obstruction, and there can be obtained a glass ribbon of a uniform small thickness and a large width.

According to this invention, there is hardly any decrease in the width of a glass ribbon on a molten bath which is inevitable according to the conventional method in the manufacture of a glass ribbon of a small thickness, and therefore, the exposed area of the molten bath is maintained small. Consequently, there is less convection of the molten material caused by the difference in temperature of the molten bath, and the zig-zag movement of the glass ribbon can be prevented. Moreover, the molten material is contaminated less by the exposure of the bath.

Illustrative embodiments of the invention will now be described with reference to the accompanying drawings, in which.

Figure 1:
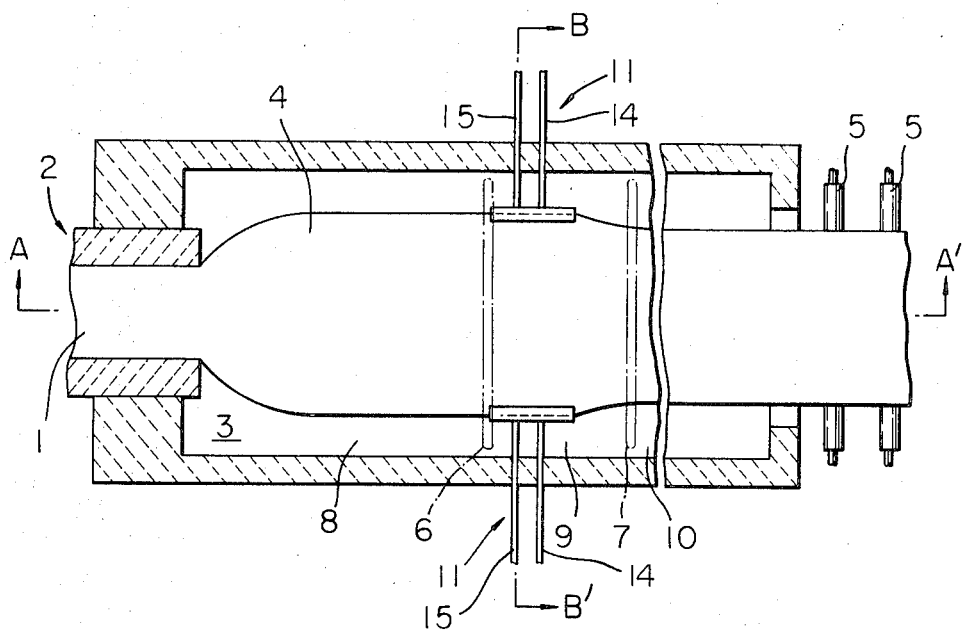
FIG. 1 is a top plan showing one embodiment of the invention.
Figure 2:
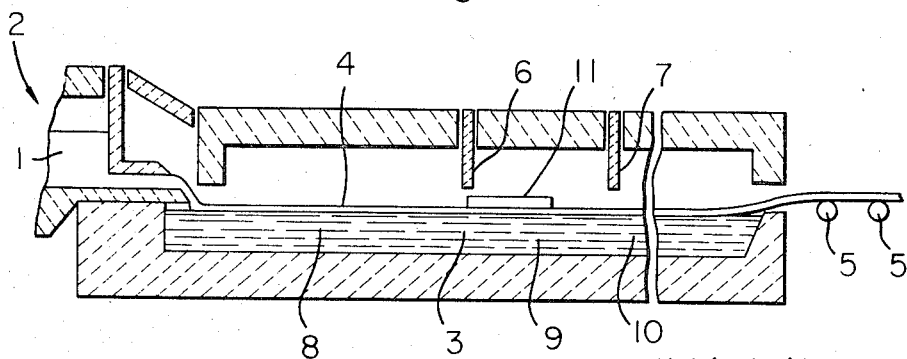
FIG. 2 is a longitudinal section taken along the line A–A' of FIG. 1.
Figure 3:
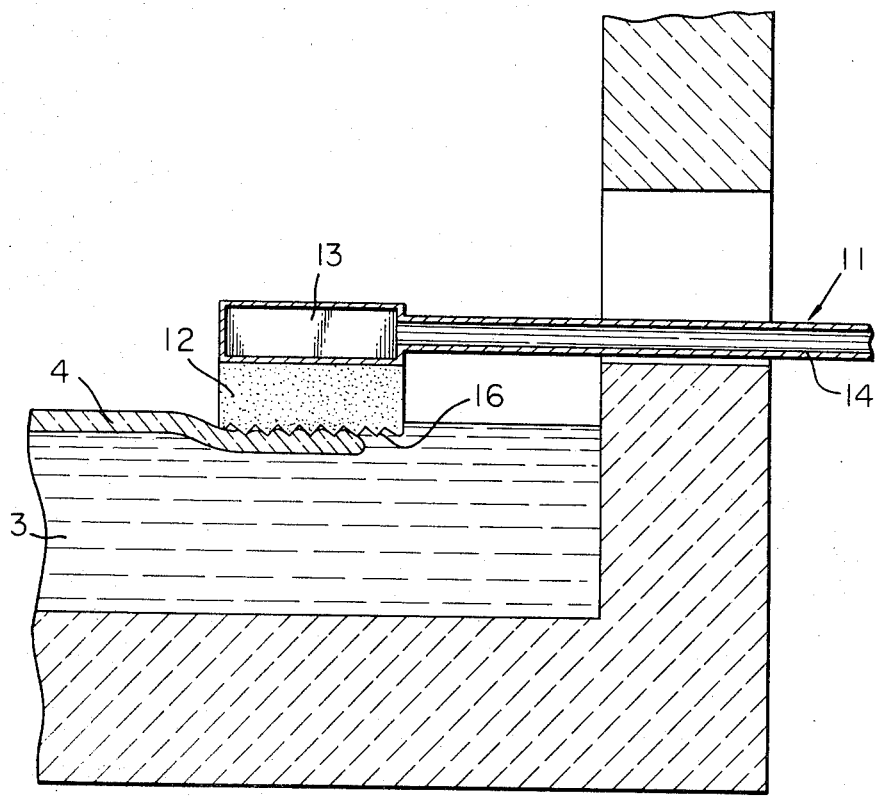
FIG. 3 is a partially enlarged cross section taken along the line B–B' of FIG. 1.

Molten glass 1 flows onto a molten metal bath 3 from a forehearth 2 of a glass melting furnace, and advances on the molten metal bath 3 as a ribbon-like glass 4. The glass ribbon 4 which has been cooled and fully solidified on the said bath leaves the molten metal bath 3, is transported by roller conveyors 5, and is cut off after passing an annealing furnace.

By partition walls 6 and 7 provided above the molten metal bath, the molten metal bath 3 is divided into a first zone 8, a second zone 9 and a third zone 10. The glass ribbon 4 in a molten state is splayed within the first zone 8 to a thickness determined by an interfacial tension between the glass and the molten metal, and is gradually cooled while advancing with a certain width. The glass ribbon 4 is in a plasticized state when passing under the partition wall 6, and advances in the second zone 9 while being gradually cooled. Control means 11 are disposed on both edges of the glass ribbon within the second zone 9, and consist of a graphite member 12, a cooling box 13 provided on the said member 12, and conduits 13 and 14 adapted to introduce a cooling liquid into the said box 13 and discharge it from the box 13. A bottom 16 of the member 12 of the control means are of groove-like concavities and convexities extend long in the advancing direction of the glass ribbon. The conduits 14 and 15 are supported by a supporting means (not shown) disposed outside the molten metal bath so that the bottom surface 16 of the control means 11 may be situated just a little below the upper surface of the glass afloat freely. Accordingly, the edge portions of the glass ribbon below the member 12 of the control means 11 are sunk into the molten metal bath and undergo buoyancy. They are pushed against the bottom surface 16 of the member 12, and deformed along the groove-like concavities and convexities on the bottom surface.

The glass ribbon which has entered the second zone 9 is accelerated by the pulling force of the roller conveyor 5, and the edge portions of the glass ribbon under acceleration are subject to a lateral force acting to reduce the width of the glass ribbon. Since, however, the concavities and convexities on the upper surface are fitted into the convexities and concavities of the bottom surface 16 of the member 12, the edge portions of the glass ribbon under the control means 11 do not move in a lateral direction, and advance along the grooves on the bottom surface. The force in a lateral direction does not act so strongly, and the concavities and convexities on the upper surface of the edge portions of the glass ribbon are not deformed again. As the member 12 made of graphite has a property of not being wetted by the glass, it advances under a slight frictional resistance without sticking to the member 12. While the glass ribbon is passing under the control member, its width is hardly decreased, and only the thickness is decreased. After passing under the control member, the glass ribbon is further accelerated, and advances while being somewhat reduced in width and thickness. During the passage, the curve and the unevenness on the upper surface of the edge portions almost disappear and the glass ribbon becomes flat. The glass ribbon is roughly stabilized when passing under the partition wall 7, and after entrance into the third zone 10, is further cooled and taken out unharmed from the molten metal bath.

The width and thickness of the glass ribbon taken out from the molten metal bath can be adjusted to a predetermined size depending upon the temperature conditions and the length of the glass in the second zone, the length of the control member and the pulling force to be exerted on the glass ribbon. For instance, it is possible to avoid the decrease in the width of the glass ribbon completely, by making the length of the control member greater than the length of the glass ribbon in the second zone. Or it is possible to broaden the width of the glass ribbon by providing both of the control members in a splaying fashion towards the outside of the glass ribbon.

Figure 4:
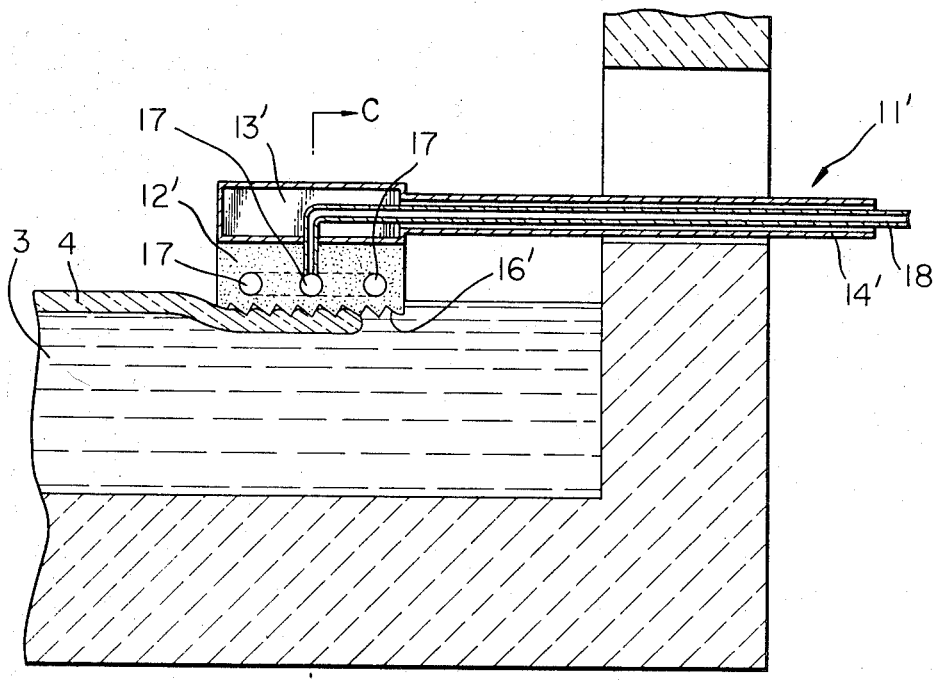
FIG. 4 is a cross section showing another embodiment of the invention.
Figure 5:
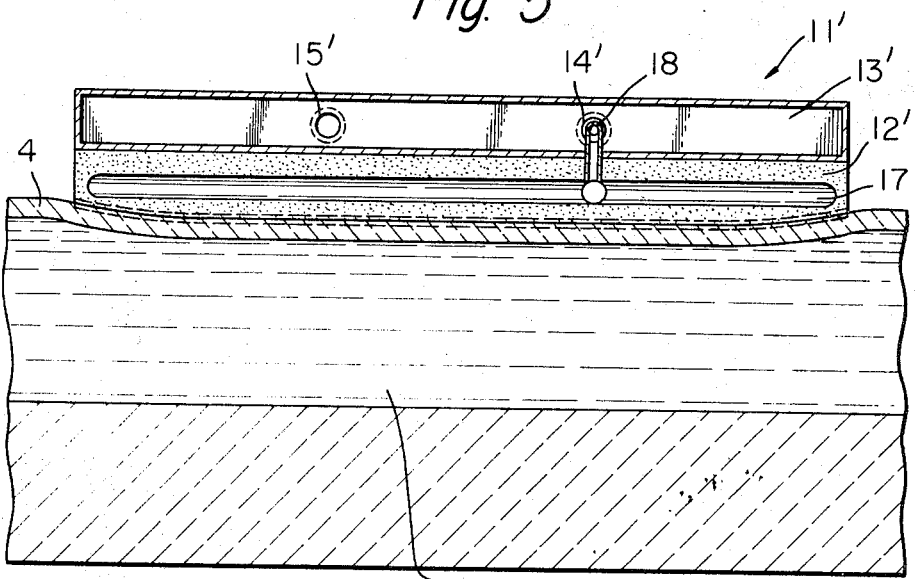
FIG. 5 is a longitudinal section taken along the line C–C' of FIG. 4.

The sticking of the control means 11 to the edge portions of the glass can be prevented by constructing the member 12 of the control means 11 with a gas-permeably porous refractory material such as porous graphite, feeding a pressurized gas into the interior of the member 12, and blowing it out from its surface. The structure of the control means 11' having a member 12' of porous graphite is shown in FIGS. 4 and 5. Within the member 12' is provided a cavity 17 extending along the wall. A conduit 18 extends into the cavity 17. The reference numeral 13' shows a cooling box provided on the member 12', and 14' and 15', conduits for introducing a cooling fluid into the box 13' and discharging it from the box 13'. A gas is introduced from the conduit 18 into the cavity 17, and blown out from the bottom surface 16' of the member 12'. By the pressure of blowing, a slight gas comes into existence between the bottom surface 16' of the member 12' and the edge portions of the glass, whereby the sticking of the edge portions to the control means 11' is prevented. The blown gas passes through an upper space within the grooves on the bottom surface of the member 12', and leaves the control means. To effect the deformation of the edge portions smoothly when they pass under the control member or leave there, it is advantageous, as shown in FIG. 5, to make the bottom surface 16' of the control means 11' slightly convex.

The gas to be fed into the control means 11' is preferably a non-oxidizing gas such as nitrogen gas in order to prevent the oxidation of the molten metal. The pressure of the gas to be fed varies depending upon the permeation resistance of the porous wall 12'. It may be about 0.01–1 kg./cm.$^2$ as an initial pressure when the wall is a graphite wall having a porosity of 15–30% and the depth of the cavity 17 from the wall surface is 5–15 mm. An adequate amount of the gas flowing is about 100–5000 cc./hr. per square centimeter of the surface of the porous wall 12′.

To obtain a glass ribbon having a relatively small thickness, for instance, about 3 mm., the temperature of the glass ribbon to be accelerated in the second zone is maintained as high as possible within the range of plasticity of the glass. The edge portions of the glass ribbon under high temperatures do not stick at all to the control member and a frictional resistance between them is very small when the control member 11′ is applied. Consequently, the glass ribbon is accelerated at a uniform advancing speed in a widthwise direction, and a glass ribbon taken out from the molten metal bath is not distorted but has a flat parallel surface.

To minimize the corrosion of the graphite member of the control means, a cooling box is provided on the said member for cooling it. If the cooling action is enhanced the edge portions of the glass are cooked via the member and come to have an increased viscosity. There is no fear at all therefore that the edge portions of the deformed glass move inwardly in a lateral direction, since they are fitted into the convexities and concavities on the bottom surface of the control member.

Instead of sinking the edge portions of glass into a molten metal bath by a control member as above mentioned, the upper surface of the edge portions of glass may be deformed by providing a contacting member not wettable with the glass within the molten metal bath in contact with the under surface of the edge portions of the glass, and pinching the edge portions between the contacting member and the control member.

We claim:

1. Apparatus for use in the manufacture of flat glass having a thickness less than the equilibrium thickness, said apparatus comprising a tank containing a molten material having a specific gravity greater than that of molten glass; means for subjecting the molten glass to a pulling force in its advancing direction to accelerate that portion of the glass ribbon which is still in a plastic state; controlling means for preventing a decrease in the width of the glass ribbon, said control means being provided over each of the side edges of at least a portion of the glass ribbon which has a tendency to decrease in width while being accelerated, each of said control means comprising an elongated member made of a refractory material which is not wettable by the molten glass with a surface having groove-like concavities and convexities, said concavities and convexities and said member extending longitudinally in a direction substantially the same as the advancing direction of the glass ribbon, a cooling box secured to said member to cool said surface, and a plurality of pipes for supporting said member and cooling box and circulating a cooling fluid into said cooling box, the surface of each of said members having groove-like concavities and convexities being located substantially below the surface of molten material, said surfaces being positioned to press downwardly against the top of both of said side edges of at least a portion of the glass ribbon having a tendency to decrease in width during acceleration, thereby to deform the upper surfaces of both side edge portions of the glass by the buoyancy of the both side edge portions and the force of said surfaces to press the glass ribbon, and to control a decrease in width of the glass ribbon.

2. Apparatus according to claim 1 wherein said member with a surface having groove-like concavities and convexities is composed of a gas-permeable porous refractory material and includes a cavity therein, extending in its longitudinal direction, and at least one conduit communicating with said cavity is provided so as to introduce a pressurized gas into the cavity and thereby cause the gas to be blown out through said porous surface against the glass.

References Cited
UNITED STATES PATENTS

| | | | |
|---|---|---|---|
| 3,248,197 | 4/1966 | Michalik et al. | 65—182 |
| 3,353,943 | 11/1967 | Loutte | 65—99AX |
| 3,440,030 | 4/1969 | Thompson et al. | 65—182X |
| 3,442,636 | 5/1969 | Kita et al. | 65—182 |
| 3,468,652 | 9/1969 | Beck | 65—91 |
| 3,493,359 | 2/1970 | Lawrenson | 65—182 |

S. LEON BASHORE, Primary Examiner

J. B. HARDAWAY, Assistant Examiner

U.S. Cl. X.R.

65—25, 91, 99